US009830125B2

United States Patent
Zhang et al.

(10) Patent No.: US 9,830,125 B2
(45) Date of Patent: Nov. 28, 2017

(54) INFORMATION PROCESSING METHOD AND ELECTRONIC DEVICE

(71) Applicant: Lenovo (Beijing) Co., Ltd., Beijing (CN)

(72) Inventors: Yuanyi Zhang, Beijing (CN); Xu Jia, Beijing (CN); Yu Zhang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 179 days.

(21) Appl. No.: 14/475,848

(22) Filed: Sep. 3, 2014

(65) Prior Publication Data
US 2015/0248269 A1 Sep. 3, 2015

(30) Foreign Application Priority Data
Mar. 3, 2014 (CN) .......................... 2014 1 0074812

(51) Int. Cl.
G06F 17/00 (2006.01)
G06F 3/16 (2006.01)
G06F 3/048 (2013.01)

(52) U.S. Cl.
CPC .............. G06F 3/165 (2013.01); G06F 3/048 (2013.01); G06F 3/167 (2013.01)

(58) Field of Classification Search
CPC .. G06F 3/165; H04N 21/439; G09G 2340/04; G09G 2340/0492
See application file for complete search history.

(56) References Cited

U.S. PATENT DOCUMENTS

| 8,622,830 B2* | 1/2014 | Radek ................. G07F 17/32 463/30 |
| 9,503,831 B2 | 11/2016 | Chen | |
| 2012/0314872 A1* | 12/2012 | Tan .......................... H04N 5/60 381/17 |
| 2015/0003647 A1 | 1/2015 | Chen | |

FOREIGN PATENT DOCUMENTS

| CN | 1979410 A | 6/2007 |
| CN | 103167383 A | 6/2013 |
| CN | 103295610 A | 9/2013 |
| JP | 2010263559 A | 11/2010 |

OTHER PUBLICATIONS

First Chinese Office Action regarding Application No. 201410074812.0 dated Aug. 1, 2017. English translation summary provided by Unitalen Attorneys at Law.

* cited by examiner

Primary Examiner — Md S Elahee
Assistant Examiner — David Siegel
(74) Attorney, Agent, or Firm — Harness, Dickey & Pierce, P.L.C.

(57) ABSTRACT

An information processing method and an electronic device are provided, which are applied to a first electronic device. The method includes: obtaining a first multimedia file; displaying a first display window on the display unit when playing the first multimedia file; acquiring a first display direction of the first display window; and controlling an output of audio data of the first multimedia file according to the first display direction, where a transmission state of the audio data at a first position satisfies a first preset condition; and a first direction starting from a point of the first display window to the first position is consistent with the first display direction.

13 Claims, 5 Drawing Sheets

INFORMATION PROCESSING METHOD AND ELECTRONIC DEVICE

CROSS REFERENCES OF RELATED APPLICATION

The present application claims the priority to Chinese Patent Application No. 201410074812.0, entitled "INFORMATION PROCESSING METHOD AND ELECTRONIC DEVICE", filed on Mar. 3, 2014 with the State Intellectual Property Office of People's Republic of China, which is incorporated herein by reference in its entirety.

FIELD OF THE TECHNOLOGY

The present application relates to the field of electronic technology, particularly to an information processing method and an electronic device.

BACKGROUND

With rapid development of electronic technology, people's lives are closely linked with networks and electronic products with various functions. In addition, various applications are provided to enrich and facilitates people's lives. Applications, such as video playing software and e-books, have been indispensable tools for many people's daily entertainment and amusement.

At present, when viewing a multimedia file through an application or a webpage, a user can adjust a display direction of a display window by dragging an edge of the corresponding display window or by moving an electronic device. Thus, the user can view the multimedia file at any location in relation to the electronic device.

However, there are at least following technical problems in the existing technologies.

After adjusting the display direction of the display window to be convenient to viewing the multimedia file, the user can only manually adjust a audio output unit of the electronic device to make a state of the audio output unit outputting audio data correspond to the display direction of the display window.

In the existing technology, when playing the multimedia file, there is a technical problem that the output state of the audio data of the multimedia file can not be controlled according to the display direction of the window for displaying the multimedia file.

SUMMARY

In one aspect, following technical solutions are provided according to an embodiment of the application.

An information processing method is applied to a first electronic device, where the first electronic device includes a display unit and N audio output units, and N is a positive integer greater than 1. The method includes:

obtaining a first multimedia file, where the first multimedia file is played in a first display window;

displaying the first display window on the display unit when playing the first multimedia file;

acquiring a first display direction of the first display window; and controlling L audio output units among the N audio output units to output audio data of the first multimedia file according to the first display direction, where a transmission state of the audio data at a first position satisfies a first preset condition, and N≥L≥1; where a first direction starting from a point of the first display window to the first position is consistent with the first display direction.

Optionally, in a case that the first preset condition is that an amplitude of the audio data is larger than a first preset amplitude, the controlling L audio output units among the N audio output units to output audio data of the first multimedia file according to the first display direction, includes: determining the L audio output units from the N audio output units according to the first display direction, where an angle between a central output direction of each of the L audio output units and the first display direction is smaller than a first preset angle; controlling the L audio output units to output the audio data; and controlling audio output units of the N audio output units except the L audio output units to output offset audio data corresponding to the audio data, where the offset audio data is configured to offset the audio data, and an amplitude of the audio data offset by the offset audio data at a second position is smaller than a second preset amplitude, and where the second position is different from the first position.

Optionally, in a case that the first preset condition is that an amplitude of the audio data is larger than a first preset amplitude, the controlling L audio output units among the N audio output units to output audio data of the first multimedia file according to the first display direction, includes: determining the L audio output units from the N audio output units according to the first display direction, where an angle between a central output direction of each of the L audio output units and the first display direction is smaller than a first preset angle; controlling the L audio output units to output the audio data; and controlling audio output units of the N audio output units except the L audio output units to be in a no output state, where an amplitude of the audio data at a second position is smaller than a third preset amplitude, and the second position is different from the first position.

Optionally, in a case that the first preset condition is that an amplitude of the audio data is larger than first preset amplitude, N=L, and each of the N audio output units is connected to the electronic device through a rotatable structure, the controlling L audio output units among the N audio output units to output audio data of the first multimedia file according to the first display direction, includes: rotate the N audio output units under a control according to the first display direction, where an angle between a central output direction of each of the rotated N audio output units and the first display direction is smaller than a second preset angle; and controlling the N audio output units to output the audio data.

Optionally, in a case that the audio data are audio coding data generated by coding the first multimedia file, and the first preset condition is that a signal intensity of the audio coding data is greater than a first preset intensity, the controlling L audio output units among the N audio output units to output audio data of the first multimedia file according to the first display direction, includes: controlling the L audio output units among the N audio output units to output the audio coding data according to the first display direction, where a second electronic device at the first position receives and obtains the audio coding data.

Optionally, after the controlling L audio output units among the N audio output units to output audio data of the first multimedia file according to the first display direction, the method further includes: receiving a first input operation to change a display direction of the first display window from the first display direction to a second display direction; acquiring the second display direction based on the first input operation; and controlling the L audio output units among the N audio output units to output the audio data of the first multimedia file according to the second display direction, where a transmission state of the audio data at a third position satisfies the first preset condition; and a third direction starting from a point of the first display window to the third position is consistent with the second display direction.

In another aspect, an information processing method is further provided according to an embodiment of the application, which is applied to a first electronic device, where the first electronic device includes a display unit and N audio output units, and N is a positive integer greater than 1. The method includes:

obtaining M multimedia files, where M≥2, and the M multimedia files are played in M display windows respectively;

displaying the M display windows on the display unit when playing the M multimedia files;

acquiring a display direction of each of the M display windows, where a one to one relationship is provided between the M display directions and the M display windows; and controlling L audio output units among the N audio output units to output M pieces of audio data of the M multimedia files according to the M display directions, where a transmission state of audio data at one of the M positions corresponding to the M display windows satisfies a first preset condition, and N≥L≥1; where a one to one relationship is provided between the M positions and the M display windows, and a direction starting from a point of one of the M display windows to a position of the one of the M display windows is consistent with the display direction of the one of the M display windows.

In another aspect, an electronic device is further provided according to an embodiment of the application. The electronic device may be a first electronic device, which includes a display unit and N audio output units, where N is a positive integer greater than 1. The first electronic device further includes:

a first multimedia module, configured to obtain a first multimedia file, where the first multimedia file is played in a first display window;

a first play module, configured to display the first display window on the display unit when playing the first multimedia file;

a first acquisition module, configured to acquire a first display direction of the first display window; and a first control module, configured to, control L audio output units among the N audio output units to output audio data of the first multimedia file according to the first display direction, where a transmission state of the audio data at a first position satisfies a first preset condition, and N≥L≥1; where a first direction starting from a point of the first display window to the first position is consistent with the first display direction.

Optionally, in a case that the first preset condition is that an amplitude of the audio data is larger than a first preset amplitude, the first control module includes: a first determining unit, configured to determine the L audio output units from the N audio output units according to the first display direction, where an angle between a central output direction of each of the L audio output units and the first display direction is smaller than a first preset angle; a first output unit, configured to control the L audio output units to output the audio data; and an offset unit, configured to control audio output units of the N audio output units except the L audio output units to output offset audio data corresponding to the audio data, where the offset audio data is configured to offset the audio data, and an amplitude of the audio data offset by the offset audio data at a second position is smaller than a second preset amplitude, and where the second position is different from the first position.

Optionally, if the first preset condition is that an amplitude of the audio data is larger than a first preset amplitude, the first control module includes: a second determining unit, configured to determine the L audio output units from the N audio output units according to the first display direction, where an angle between a central output direction of each of the L audio output units and the first display direction is smaller than a first preset angle; a second output unit, configured to control the L audio output units to output the audio data; and a silencing unit, configured to control audio output units of the N audio output units except the L audio output units to be in a no output state, where an amplitude of the audio data at a second position is smaller than a third preset amplitude, and the second position is different from the first position.

Optionally, in a case that the first preset condition is that an amplitude of the audio data is larger than first preset amplitude, N=L, and each of the N audio output units is connected to the electronic device through a rotatable structure, the first control module includes: a rotation control unit, configured to rotate the N audio output units under a control according to the first display direction, where an angle between a central output direction of each of the N audio output units and the first display direction is smaller than a second preset angle; and a third output unit, configured to control the N audio output units to output the audio data.

Optionally, in a case that the audio data are audio coding data generated by coding the first multimedia file, and the first preset condition is that a signal intensity of the audio coding data is greater than a first preset intensity, the first control module is further configured to control the L audio output units among the N audio output units to output the audio coding data according to the first display direction, where a second electronic device at the first position receives and obtains the audio coding data.

Optionally, the first electronic device further includes: a receiving module, configured to receive a first input operation to change a display direction of the first display window from the first display direction to a second display direction; a second acquisition module, configured to acquire the second display direction based on the first input operation; and a second control module, configured to control the L audio output units among the N audio output units to output the audio data of the first multimedia file according to the second display direction, where a transmission state of the audio data at a third position satisfies the first preset condition; and a third direction starting from a point of the first display window to the third position is consistent with the second display direction.

In another aspect, an electronic device is provided according to an embodiment of the application. The electronic device may be a first electronic device, which includes a display unit and N audio output units, where N is a positive integer greater than 1. The first electronic device further includes:

a second multimedia module, configured to obtain M multimedia files, where M≥2, and the M multimedia files are played in M display windows respectively;

a second play module, configured to display the M display windows on the display unit when playing the M multimedia files;

a third acquisition module, configured to acquire a display direction of each of the M display windows, where a one to one relationship is provided between the M display directions and the M display windows; and a third control module, configured to control L audio output units among the N audio output units to output M pieces of audio data of the M multimedia files according to the M display directions, where a transmission state of audio data at one of the M positions corresponding to the M display windows satisfies a first preset condition, and $N \geq L \geq 1$; where a one to one relationship is provided between the M positions and the M display windows, and a direction starting from a point of one of the M display windows to a position of the one of the M display windows is consistent with the display direction of the one of the M display windows.

DETAILED DESCRIPTION OF THE EMBODIMENTS

An information processing method and an electronic device are provided according to embodiments of the application, to achieve a technical effect that the electronic device can control an output state of audio data corresponding to a first multimedia file according to a display direction of a window for displaying the multimedia file.

An information processing method and an electronic device are provided according to embodiments of the application, so as to solve the technical problem that when playing a multimedia file, an output state of the audio data of the multimedia file can not be controlled according to the display direction of the window for displaying the multimedia file in the existing technology.

To solve the above technical problem, a general idea of technical solutions provided in embodiments of the application is as follows.

An information processing method is applied to a first electronic device, where the first electronic device includes a processor, a memory for storing code which is executable by the processor, a display unit and N voice or audio output units, and N is a positive integer greater than 1. The voice or audio output units may be, for example, speakers. The method includes:

obtaining a first multimedia file, where the first multimedia file is played in a first display window;

displaying the first display window on the display unit when playing the first multimedia file;

acquiring a first display direction of the first display window; and controlling L audio output units among the N audio output units to output audio data of the first multimedia file according to the first display direction, where a transmission state of the audio data at a first position satisfies a first preset condition, and $N \geq L \geq 1$; where a first direction starting from a point of the first display window to the first position is consistent with the first display direction.

Thus, when playing the first multimedia file, a first display direction of a first display window is acquired, the audio data of the first multimedia file is output under the control according to the first display direction. In this way, it is ensured that a transmission state of audio data at a first position satisfies a first preset condition where the first position is in a line, which starts from a point of the first display window and is in the first display direction. Thus, a technical effect that the electronic device can control an output state of the audio data of the first multimedia file according to the display direction of the display window of the multimedia file is achieved.

To understand the technical solutions better, the technical solutions are described below in detail in combination with the drawings and embodiments.

First Embodiment

Figure 1:
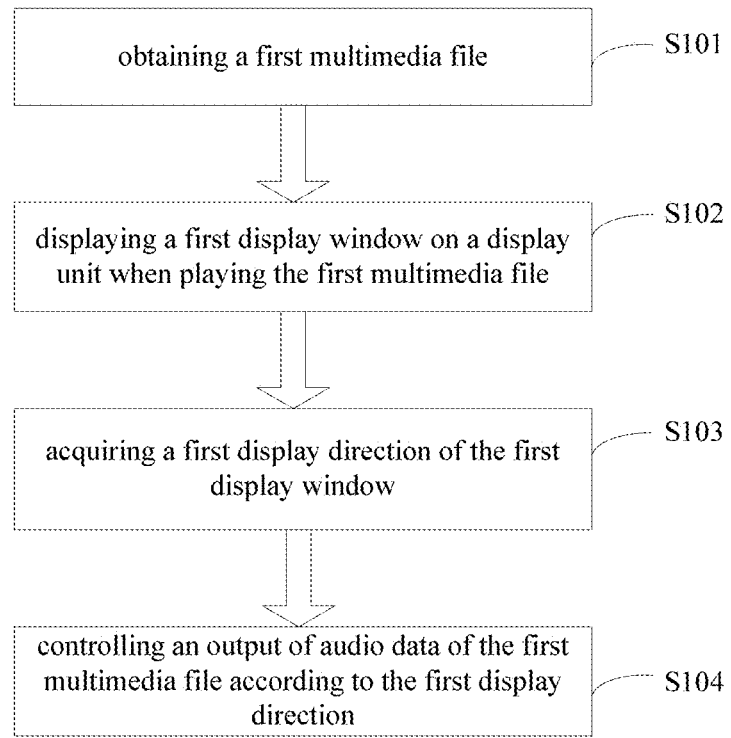
FIG. 1 is a flow chart of an information processing method according to a first embodiment of the application.

An information processing method is provided in the first embodiment. The information processing method is applied to a first electronic device, where the first electronic device includes a display unit and N audio output units, and N is a positive integer greater than 1. FIG. 1 is a flow chart of the information processing method according to the first embodiment of the application. Referring to FIG. 1, the method includes steps S101-S104.

The step S101 includes: obtaining a first multimedia file, where the first multimedia file is played in a first display window.

The step S102 includes: displaying the first display window on the display unit when playing the first multimedia file.

The step S103 includes: acquiring a first display direction of the first display window.

The step S104 includes: controlling L audio output units among the N audio output units to output audio data of the first multimedia file according to the first display direction, where a transmission state of the audio data at a first position satisfies a first preset condition, and $N \geq L \geq 1$; and where a first direction starting from a point of the first display window to the first position is consistent with the first display direction.

In an implementation, the first electronic device may be an electronic device such as an all-in-one computer, a desktop device with a large screen, a digital photo frame, a smart TV, a tablet computer or a smart phone, which will not be listed herein.

The information processing method according to the embodiment is preliminarily described below from a perspective of human-computer interaction by taking a case that the first electronic device is a desktop device with large screen as an example.

Figure 2:
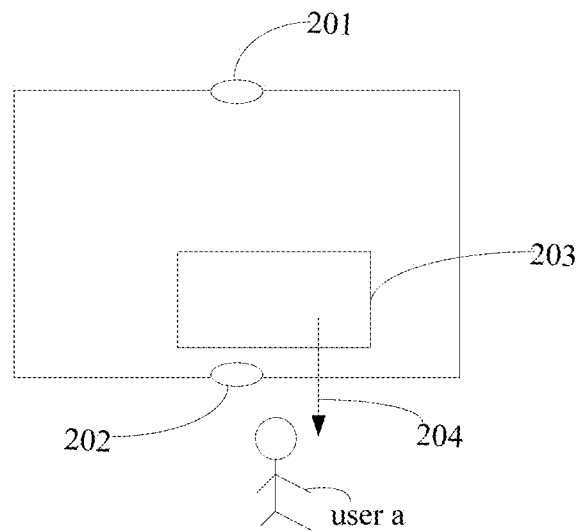
FIG. 2 is a first diagram of the information processing method according to the first embodiment of the application.

For example, as shown in FIG. 2, the desktop device with the large screen device includes a first speaker 201 and a second speaker 202. A user a stands by one side of the desktop device with the large screen device to view a video through the desktop device with the large screen device.

First, the user a opens a video file on the desktop device with the large screen device. The desktop device with the large screen device performs the steps S101 and S102 to obtain and play the video file and display a display window 203 for displaying the video file on the display unit.

Next, the user adjusts a display direction 204 of the display window 203 to a direction starting from a point on the display window to the position of the user a, for the convenience of viewing.

Then, the desktop device with the large screen device performs the step S103, to acquire the display direction 204 of the display window 203.

Further then, the desktop device with the large screen device performs the step S104, to control the second speaker 202 with an output direction same as the display direction 204 to output the audio data of the video file. Thus, the user a can hear the audio data clearly.

After a preliminary understanding of the information processing method according to the embodiment through the foregoing example, an implementation of the method according to the embodiment is described below in detail.

First, the step S101 is performed to obtain a first multimedia file, where the first multimedia file is played in a first display window.

In an implementation, the first multimedia file may be a video file, an image with a voice background or an audio file with a playing control window. The first display window may be an application interface window configured to play the first multimedia file, which will not be listed herein.

In an implementation, the first multimedia file may be obtained by reading a first multimedia file from a storage unit of the electronic device, or may be obtained from a server or other electronic devices through a network.

After obtaining the first multimedia file by performing the step S101, the step S102 is performed, i.e., the first display window is displayed on the display unit when the first multimedia file is played;

Then, the step S103 is performed to acquire a first display direction of the first display window.

In one embodiment, multiple sensors are located at the edges of the desktop device. The sensors may acquire the location of the user with respect to the desktop, and a window may be displayed toward the user.

In another embodiment, multiple sensors are located at the edges of the desktop device, and the sensors may acquire the location of the user with respect to the desktop. The user may further perform a click operation on the desktop, for example, click an icon displayed on the desktop. The touch point of the click operation may be determined, and accordingly, a first direction from the location of the user to the touch point of the click operation is determined. A window corresponding to the icon may be displayed in a direction opposite to the first direction. In this case, when there are multiple users located around the desktop, the window is only displayed toward the performer of the click operation.

Figure 10:
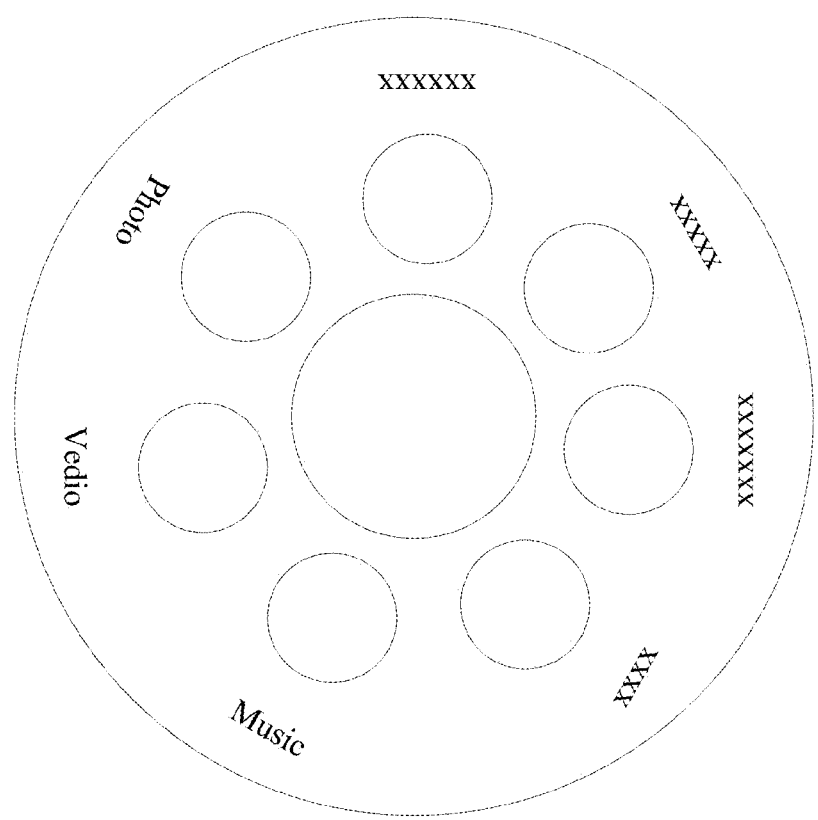
FIG. 10 is a diagram of circular menu displayed in the first display window according to an embodiment of the application.

In further another embodiment, a circular menu may be displayed in the first display window, as shown in FIG. 10. Objects are spaced on the periphery of the circular menu, and each of the objects is displayed in a radial direction of the circular menu. When the user clicks one object in the circular menu, a window corresponding to the object may be displayed in a direction same as the radial direction along which the object is displayed on the circular menu. For example, if the user clicks an "Video" icon, a window corresponding to the "Video" icon is displayed in a direction same as the radial direction along which the "Video" icon is displayed on the circular menu, i.e., a direction from the top of the letter V of the "Video" to the bottom of the letter V of the "Video". Furthermore, an video subsequently played in the window, in response to the click operation on the "Video" icon, is also displayed in the direction same as the radial direction along which the "Video" is displayed on the circular menu.

In an implementation, when the first display window is an application interface window configured to play the first multimedia file, the first display direction is a preset display direction of the application interface window. The multimedia file displayed in the application interface window may be displayed according to the preset display direction. In this way, a user, in a line which starts from a point of the application interface window and is in the preset display direction, can accurately acquire contents of the multimedia file via contents displayed on the application interface window.

After acquiring the first display direction by performing the step S103, the step S104 is performed. The step S104 includes: controlling L audio output units among the N audio output units to output audio data of the first multimedia file according to the first display direction, where a transmission state of the audio data at a first position satisfies a first preset condition, and $N \geq L \geq 1$; where a first direction starting from a point of the first display window to the first position is consistent with the first display direction.

In an implementation, if first preset conditions to be satisfied are different, the methods for controlling the L audio output units among the N audio output units to output the audio data are different. The methods for controlling the L audio output units to output the audio data is described by taking two cases as examples. In the first case, the first preset condition is that an amplitude of the audio data is larger than a first preset amplitude. In the second case, the first preset condition is that the audio data satisfies a preset stereo sound effect.

In the first case, the amplitude of the audio data is larger than the first preset amplitude.

In an implementation, many methods are provided to implement that the amplitude of the audio data at the first position is larger than the first preset amplitude. Three methods A, B and C are provided below in the embodiment.

The method A includes: first determining the L audio output units from the N audio output units according to the first display direction, where an angle between a central output direction of each of the L audio output units and the first display direction is smaller than a first preset angle;

then, controlling the L audio output units to output the audio data; and controlling audio output units of the N audio output units except the L audio output units to output offset audio data corresponding to the audio data, where the offset audio data is configured to offset the audio data, and an amplitude of the audio data offset by the offset audio data at a second position is smaller than a second preset amplitude, and where the second position is different from the first position.

For example, a user views a video file with an electronic device. It is assumed that the first preset angle is 30 degree.

Figure 3:
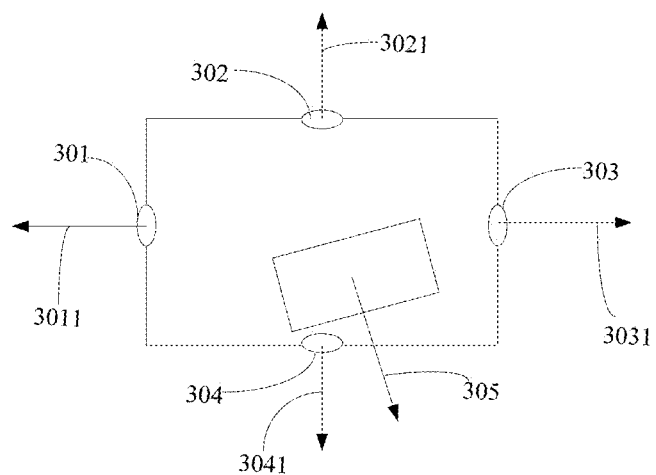
FIG. 3 is a second diagram of the information processing method according to the first embodiment of the application.

As shown in FIG. 3, an electronic device includes: a first audio output unit 301 with a first central output direction 3011, a second audio output unit 302 with a second central output direction 3021, a third audio output unit 303 with a third central output direction 3031, and a fourth audio output unit 304 with a fourth central output direction 3041.

Among the above four audio output units, only the fourth central output direction 3041 of the fourth audio output unit 304 has an angle smaller than 30 degree in relation to a first display direction 305. Thus, only the fourth audio output unit 304 is controlled to output the audio data of the video file, and the first audio output unit 301, the second audio output unit 302 and the third audio output unit 303 are controlled to be in a muted state.

Particularly, L audio output units are used to output the audio data of the multimedia file, where an angle between the central output direction of each of the L audio output units and the first display direction is smaller than the first preset angle. In addition, audio output units of the M audio output units other than the L audio output units are controlled to be in a no output state. In this way, it is ensured that a volume of the audio data at a first position is large enough, and a volume of the audio data at a second position different from the first position is reduced, where the first position is in a line which starts from a point of the first display window and is in the first display direction. Thus, the user at the first position may clearly obtain the audio data, and an interference of the audio data on users at the second position may be reduced.

The method B includes: first determining the L audio output units from the N audio output units according to the first display direction, where an angle between a central output direction of each of the L audio output units and the first display direction is smaller than a first preset angle;

then, controlling the L audio output units to output the audio data; and controlling audio output units of the N audio output units except the L audio output units to be in a no output state, where an amplitude of the audio data at a second position is smaller than a third preset amplitude, and the second position is different from the first position.

Figure 4:
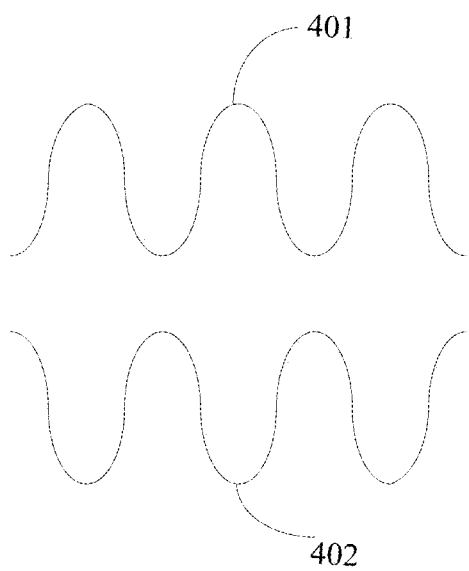
FIG. 4 is a diagram of offset audio data according to the first embodiment of the application.

In an implementation, as shown in FIG. 4, the offset audio data 401 may be set to have a same frequency and amplitude as the audio data 402 and have an inverted phase with respect to the audio data 402.

Particularly, audio output units other than the L audio output units is controlled to output offset audio data corresponding to the audio data. In this way, the volume of the audio data at the first position is large enough, and the volume of the audio data at the second position different from the first position is further reduced, where the first position is in a line which starts from a point of the first display window and is in the first display direction. Furthermore, the user at the first position may clearly obtain the audio data, and an interference of the audio data on users at the second position is further reduced.

The method C includes: rotate the N audio output units under a control according to the first display direction, where an angle between a central output direction of each of the rotated N audio output units and the first display direction is smaller than a second preset angle; and where each of the N audio output units is connected to the electronic device through a rotatable structure; and then, controlling the N audio output units to output the audio data.

Figure 5:
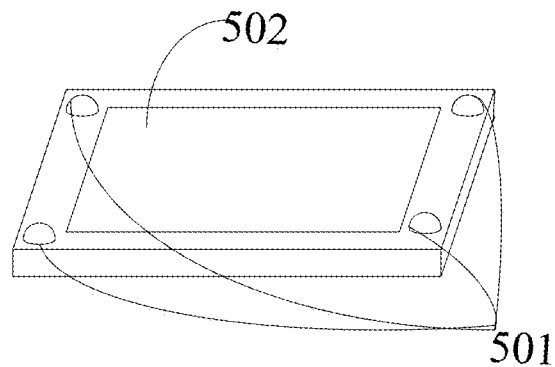
FIG. 5 is a diagram of positions of audio output units according to the first embodiment of the application.

In an implementation, as shown in FIG. 5, the N audio output units 501 may be arranged on a first surface provided with a display unit, each of which may rotate between 0 and 360 degree in a plane parallel to the first surface via the rotatable structure.

Particularly, the N audio output units are controlled to rotate according to the first display direction, such that an angle between the central output direction of each of the N audio output units and the first display direction is smaller than the second preset angle; and then the N audio output units are controlled to output the audio data, so as to enhance the volume of the audio data at the first position, where the first position is in a line which starts from a point of the first display window and is in the first display direction.

In the second case, the first preset condition is that the audio data satisfies a preset stereo sound effect.

In an implementation, to achieve the stereo sound effect, different audio output units of the electronic device are preset to output different audio data, and thus a user may obtain a perspective stereo sound effect by acquiring and combining the different audio data.

Particularly, if the audio data includes left audio data and right audio data, the N audio output units may be controlled to output the left audio data and the right audio data according to the first display direction. In this way, when the user is located at a first position and faces the first display window, audio output units close to the user's left ear output the left audio data of the first multimedia file; and audio output units close to the user's right ear output the right audio data of the first multimedia file, where the first position is in a line which starts from a point of the first display window and is in the first display direction.

In an embodiment of the application, after the step S104 of controlling L audio output units to output audio data according to the first display direction, the method further includes:

receiving a first input operation to change a display direction of the first display window from the first display direction to a second display direction;

acquiring the second display direction based on the first input operation;

controlling the L audio output units among the N audio output units to output the audio data of the first multimedia file according to the second display direction, where a transmission state of the audio data at a third position satisfies the first preset condition; and a third direction starting from a point of the first display window to the third position is consistent with the second display direction.

In another aspect, base on a same inventive concept, another embodiment according to the application is provided, referring to the second embodiment.

Second Embodiment

The information processing method according to the second embodiment includes the steps S101-S104 provided in the first embodiment. In the case that the audio data are audio coding data generated by coding the first multimedia file, and the first preset condition is that the signal intensity of the audio coding data is larger than a first preset intensity, the step S104 of controlling L audio output units among the N audio output units to output audio data of the first multimedia file according to the first display direction may further include:

controlling the L audio output units among the N audio output units to output the audio coding data according to the first display direction, where a second electronic device at the first position may receive and obtain the audio coding data.

In an implementation, the second electronic device may be an all-in-one computer, a desktop device with the large screen device, a digital photo frame, a smart TV, a tablet computer or a smart phone, which will not be listed herein.

The information processing method provided in the embodiment is described below by taking a case that the first electronic device is a desktop device with the large screen device and an infrared unit and the second electronic device is an infrared wireless headphone as an example.

For example, when a user a views a video with a desktop device with the large screen device:

First, the user a opens a video file on the desktop device with the large screen device, and the desktop device with the large screen device performs steps S101 and S102 to obtain and play the video file and display a display window of the video file on the display unit.

Next, the user adjusts a display direction of the display window to a direction starting from a point of the display window to the position of the user a, for the convenience of viewing.

Then, the desktop device with the large screen device performs step S103, to acquire the display direction.

Further then, the desktop device with the large screen device performs step S104, to control the infrared unit to output the audio coding data of the video file in the display direction, such that the infrared wireless headphone worn by the user a may receive the audio coding data.

Finally, the infrared wireless headphone decodes the received audio coding data, and outputs the decoded audio data. In this way, the user a can obtain the audio data of the video file.

In another aspect, base on a same inventive concept, another embodiment according to the application is provided, referring to the third embodiment.

Third Embodiment

Figure 6:
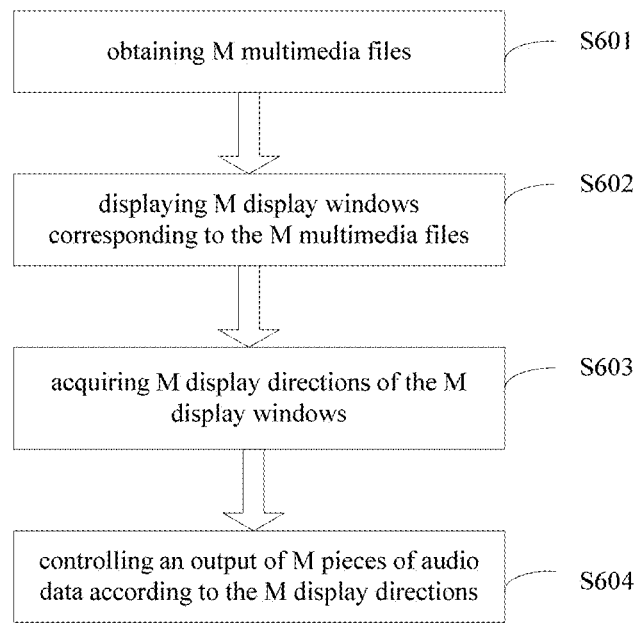
FIG. 6 is a flow chart of an information processing method according to a third embodiment of the application.

An information processing method is provided according to the third embodiment. The information processing method is applied to a first electronic device including a display unit and N audio output units, where N is a positive integer greater than 1. FIG. 6 is a flow chart of the information processing method according to the third embodiment of the application. Referring to FIG. 6, the method includes steps S601-S604.

The step S601 includes: obtaining M multimedia files, where M≥2, and the M multimedia files are played on M display windows respectively.

The step S602 includes: displaying the M display windows on the display unit when playing the M multimedia files.

The step S603 includes: acquiring a display direction of each of the M display windows, where a one to one relationship is provided between the M display directions and the M display windows.

The step S604 includes: controlling L audio output units among the N audio output units to output M pieces of audio data of the M multimedia files according to the M display directions, where a transmission state of audio data at one of M positions corresponding to the M display windows satisfies a first preset condition, and N≥L≥1; where a one to one relationship is provided between the M positions and the M display windows, and a direction starting from a point of one of the M display windows to a position of the one of the M display windows is consistent with the display direction of the one of the M display windows.

In an implementation, the second electronic device may be an all-in-one computer, a desktop device with the large screen device, a digital photo frame, a smart TV, a tablet computer or a smart phone, which will not be listed herein.

The information processing method according to the embodiment is described below by taking a case that the first electronic device is a tablet computer put flat on the table and the tablet computer includes two speakers as an example.

Figure 7:
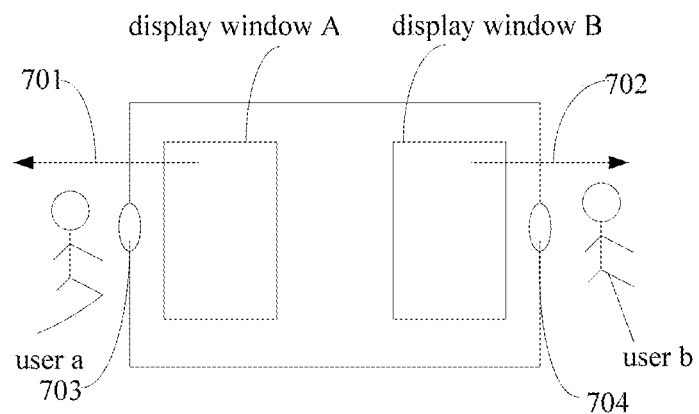
FIG. 7 is a diagram of the information processing method according to the third embodiment of the application.

For example, as shown in FIG. 7, both a user a and a user b view videos with a human-computer interaction device with a screen and an output unit, which can be operated by multiple users. The user a views a video A, and the user b views a video B.

First, the user a and the user b open the video A and the video B on the human-computer interaction device, respectively. The human-computer interaction device performs steps S101 and S102 to obtain and play the video A and the video B, and display a display window A of the video A and a display window B of the video B.

Next, the human-computer interaction device performs the step S103 to obtain a display direction 701 of the display window A and a display direction 702 of the display window B.

Then, the human-computer interaction device performs the step S104, so as to control a third speaker 703 having the same output direction as the display direction A701 to output audio data A of the video A, and to control a fourth speaker 704 having the same output direction as the display direction B702 to output audio data B of the video B. In this way, the user a can clearly hear the audio data A, and the user b can clearly hear the audio data B.

In another aspect, base on a same inventive concept, an electronic device is provided according to another embodiment of the application, which corresponds to the methods in the first embodiment and the second embodiment, referring to the fourth embodiment of the application.

Fourth Embodiment

Figure 8:
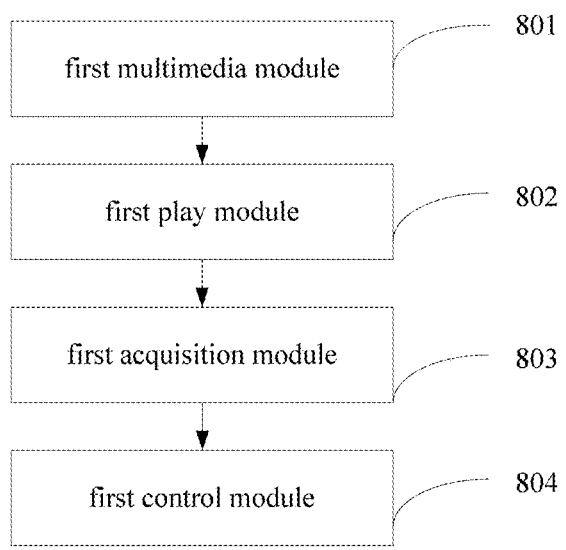
FIG. 8 is a structural diagram of an electronic device according to a fourth embodiment of the application.

In the fourth embodiment, an electronic device is provided. The electronic device may be a first electronic device, which includes a display unit and N audio output units, where N is a positive integer greater than 1. FIG. 8 is a structural diagram of the electronic device according to the fourth embodiment of the application. Referring to FIG. 8, the electronic device further includes: a first multimedia module 801, a first play module 802, a first acquisition module 803, and a first control module 804.

The first multimedia module 801 is configured to obtain a first multimedia file, where the first multimedia file is played in a first display window.

The first play module 802 is configured to display the first display window on the display unit when playing the first multimedia file.

The first acquisition module 803 is configured to acquire a first display direction of the first display window.

The first control module 804 is configured to control L audio output units among the N audio output units to output audio data of the first multimedia file according to the first display direction, where a transmission state of the audio data at a first position satisfies a first preset condition, and N≥L≥1; where a first direction starting from a point of the first display window to the first position is consistent with the first display direction.

In the embodiment of the application, in the case that the first preset condition is that an amplitude of the audio data is larger than first preset amplitude, the first control module 804 includes: a first determining unit, a first output unit, and an offset unit.

The first determining unit is configured to determine L audio output units from the N audio output units according to the first display direction, where an angle between a central output direction of each of the L audio output units and the first display direction is less than a first preset angle.

The first output unit is configured to control the L audio output units to output the audio data.

The offset unit is configured to control audio output units of the N audio output units except the L audio output units to output offset audio data corresponding to the audio data, where the offset audio data is configured to offset the audio data, and an amplitude of the audio data offset by the offset audio data at a second position is smaller than a second preset amplitude, where the second position is different from the first position.

In the embodiment of the application, in the case that the first preset condition is that an amplitude of the audio data is larger than a first preset amplitude, the first control module 804 includes: a second determining unit, a second output unit, and a silencing unit.

The second determining unit is configured to determine L audio output units from the N audio output units according to the first display direction, where an angle between a central output direction of each of the L audio output units and the first display direction is smaller than a first preset angle.

The second output unit is configured to control the L audio output units to output the audio data.

The silencing unit is configured to control audio output units of the N audio output units except the L audio output units to be in a no output state, where an amplitude of the audio data at a second position is smaller than a third preset amplitude, where the second position is different from the first position.

In the embodiment of the application, in the case that the first preset condition is that an amplitude of the audio data is larger than first preset amplitude, N=L, and each of the N audio output units is connected to the electronic device through a rotatable structure, the first control module 804 includes: a rotation control unit, and a third output unit The rotation control unit is configured to rotate the N audio output units under a control according to the first display direction, where an angle between a central output direction of each of the N audio output units and the first display direction is smaller than a second preset angle.

The third output unit is configured to control the N audio output units to output the audio data.

In the embodiment of the application, in the case that the audio data are audio coding data generated by coding the first multimedia file, and the first preset condition is that a signal intensity of the audio coding data is greater than a first preset intensity, the first control module 804 is further configured to:

control the L audio output units among the N audio output units to output the audio coding data according to the first display direction, where a second electronic device at the first position may receive and obtain the audio coding data.

In the embodiment of the application, the first electronic device further includes: a receiving module, a second acquisition module, and a second control module.

The receiving module is configured to receive a first input operation to change a display direction of the first display window from the first display direction to a second display direction.

The second acquisition module is configured to acquire the second display direction based on the first input operation.

The second control module is configured to control the L audio output units among the N audio output units to output the audio data of the first multimedia file according to the second display direction, where a transmission state of the audio data at a third position satisfies the first preset condition; and a third direction starting from a point of the first display window to the third position is consistent with the second display direction.

The electronic device according to the embodiment is based on the same inventive concept as the information processing methods according to the first embodiment and the second embodiment, which are in two different aspects. The implementation of the method is described in detail in the foregoing description. Therefore, those skilled in the art may clearly understand the structure and implementation of the electronic device in this embodiment according to the foregoing description, which will be omitted herein for short In another aspect, base on a same inventive concept, an electronic device is provided according to another embodiment of the application, which corresponds to the method in the third embodiment, referring to a fifth embodiment of the application.

Fifth Embodiment

Figure 9:
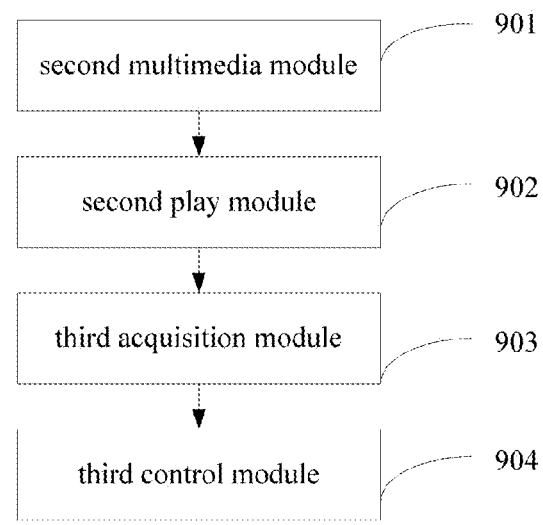
FIG. 9 is a structural diagram of an electronic device according to a fifth embodiment of the application.

In the fifth embodiment, an electronic device is provided. The electronic device may be a first electronic device, which includes a display unit and N audio output units, where N is a positive integer greater than 1. FIG. 9 is a structural diagram of the electronic device according to the fifth embodiment of the application. Referring to FIG. 9, the electronic device further includes: a second multimedia module 901, a second play module 902, a third acquisition module 903, and a third control module 904.

The second multimedia module 901 is configured to obtain M multimedia files, where M≥2, and the M multimedia files are played in M display windows respectively.

The second play module 902 is configured to display the M display windows on the display unit when playing the M multimedia files.

The third acquisition module 903 is configured to acquire a display direction of each of the M display windows, where a one to one relationship is provided between the M display directions and M display windows.

The third control module 904 is configured to control L audio output units among the N audio output units to output M pieces of audio data of the M multimedia files according to the M display directions, where a transmission state of audio data at one of the M positions corresponding to the M display windows satisfies a first preset condition, and N≥L≥1; where a one to one relationship is provided between the M positions and the M display windows, and a direction starting from a point of one of the M display windows to a position corresponding to the one of the M display windows is consistent with the display direction of the one of the M display windows.

The electronic device according to the embodiment is based on the same inventive concept as the information processing method according to the third embodiment, which are in two different aspects. The implementation of the method is described in detail in the foregoing description. Therefore, those skilled in the art may clearly understand the structure and implementation of the electronic device in this embodiment according to the foregoing description, which will be omitted herein for short.

The technical solutions provided in the foregoing embodiments of the application have at least following technical effects.

1. The method and electronic device according to embodiments of the application includes: when playing a first multimedia file, acquiring a first display direction of a first display window corresponding to the first multimedia file; controlling an output of audio data of the first multimedia file according to the first display direction. In this way, it is ensured that a transmission state of the audio data at a first position satisfies a first preset condition, where the first position is in a line which starts from a point of the first display window and is in the first display direction. Thus, an electronic device can control an output state of the audio data of the multimedia file according to the display direction of the display window of the multimedia file.

2. In the method and electronic device according to embodiments of the application, the L audio output units, in which an angle between a central output direction of each of the L audio output units and the first display direction is smaller than a preset angle, is used to output the audio data of the multimedia file; and audio output units other than the L audio output units is controlled to be in a no output state. In this way, it is ensured that a volume of the audio data at a first position is large enough, and a volume of the audio data at a second position different from the first position is reduced, where the first position is in a line which starts from a point of the first display window and is in the first display direction.

3. In the method and electronic device provided in embodiments of the application, audio output units other than the L audio output units is controlled to output offset audio data corresponding to the audio data. In this way, the volume of the audio data at the first position is large enough, and the volume of the audio data at the second position different from the first position is further reduced, where the first position is in a line which starts from a point of the first display window and is in the first display direction.

4. In the method and electronic device according to embodiments of the application, the N audio output units is rotated under the control, such that an angle between a central output direction of each of the N audio output units and the first display direction is smaller than a second preset angle; and then the N audio output units is further controlled to output the audio data, so as to enhance the volume of the audio data at the first position, where the first position is in a line which starts from a point of the first display window and is in the first display direction.

5. In the method and electronic device according to embodiments of the application, when the audio data are audio coding data generated by coding the first multimedia file, the audio coding data is output under the control according to the first display direction, to enhance a signal intensity of the audio coding data at a first position, and improve a success rate of receiving the audio coding data by a second electronic device at the first position, where the first position is in a line which starts from a point of the first display window and is in the first display direction.

Those skilled in the art should understand that an embodiment of the application may be provided as methods, systems or computer programming products. Therefore, the application may be in forms of an entire hardware embodiment, an entire software embodiment, or an embodiment implemented by a combination of software and hardware. Furthermore, the application may be in a form of one or more computer programming products implemented on computer readable storage media (including but not limited to disk storage, CD-ROM, optical storage, etc.) containing computer readable program code.

The application is described by referring to flow charts and/or block diagrams according to methods, devices (systems) and computer program product of embodiments of the application. It should be understood that each process and/or block in flow charts and/or block diagrams, as well as combinations of processes and/or blocks in flow charts and/or block diagrams can be realized by computer program instructions. A machine can be formed by providing these computer programs to a universal computer, a dedicated computer, an embedded processor or a process of the other programmable data processing apparatus. Thus, the instructions executed by a computer or a processor of the other programmable data processing apparatus may generate a device for implementing functions specified by one or more processes of flow charts and/or one or more blocks of block diagrams.

These computer program instructions may also be stored in a computer readable memory which can boot a computer or another programmable data processing apparatus to work in a certain manner, so that instructions stored in the computer readable memory produces a product including an instruction apparatus configured to realize functions specified by one or more processes of flow charts and/or one or more blocks of block diagrams.

These computer program instructions may also be loaded to a computer or the other programmable data processing apparatus, and the computer or the another programmable data processing apparatus perform a series of operations to generate processing achieved by a computer. Thus, the instructions executed on the computer or the other programmable data processing apparatus provide steps for realizing the functions specified by one or more processes of flow charts and/or one or more blocks of block diagrams.

In particular, computer program instructions corresponding to the two information processing methods in embodiments of the application can be stored in a CD-ROM, a hard disk, a USB flash disk, and so on.

For the information proceeding methods according to the first embodiment and the second embodiment, when read or executed by an electronic device, computer instructions stored in the storage medium and corresponding to the boot method include following steps:

obtaining a first multimedia file, where the first multimedia file is played in a first display window;

displaying the first display window on the display unit when playing the first multimedia file;

acquiring a first display direction of the first display window; and controlling L audio output units among the N audio output units to output audio data of the first multimedia file according to the first display direction, where a transmission state of the audio data at a first position satisfies a first preset condition, and $N \geq L \geq 1$; where a first direction starting from a point of the first display window to the first position is consistent with the first display direction.

Optionally, in a case that the first preset condition is that an amplitude of the audio data is larger than a first preset amplitude, the computer instructions stored in the storage medium and corresponding to the step of controlling L audio output units among the N audio output units to output audio data of the first multimedia file according to the first display direction, includes:

determining the L audio output units from the N audio output units according to the first display direction, where an angle between a central output direction of each of the L audio output units and the first display direction is smaller than a first preset angle;

controlling the L audio output units to output the audio data; and controlling audio output units of the N audio output units except the L audio output units to output offset audio data corresponding to the audio data, where the offset audio data is configured to offset the audio data, and an amplitude of the audio data offset by the offset audio data at a second position is smaller than a second preset amplitude, and where the second position is different from the first position.

Optionally, in the case that the first preset condition is that an amplitude of the audio data is larger than first preset amplitude, the computer instructions stored in the storage medium and corresponding to the step of controlling L audio output units among the N audio output units to output audio data of the first multimedia file according to the first display direction, include:

determining the L audio output units from the N audio output units according to the first display direction, where an angle between a central output direction of each of the L audio output units and the first display direction is smaller than a first preset angle;

controlling the L audio output units to output the audio data; and controlling audio output units of the N audio output units except the L audio output units to be in a no output state, where an amplitude of the audio data at a second position is smaller than a third preset amplitude, and the second position is different from the first position.

Optionally, in the case that the first preset condition is that an amplitude of the audio data is larger than first preset amplitude, N=L, and each of the N audio output units is connected with the electronic device through a rotatable structure, the computer instructions stored in the storage medium and corresponding to the step of controlling L audio output units among the N audio output units to output audio data of the first multimedia file according to the first display direction, include:

rotating the N audio output units under a control according to the first display direction, where an angle between a central output direction of each of the rotated N audio output units and the first display direction is smaller than a second preset angle; and controlling the N audio output units to output the audio data.

Optionally, in the case that the audio data is audio coding data generated by coding the first multimedia file, and the first preset condition is that a signal intensity of the audio coding data is greater than a first preset intensity, the computer instructions stored in the storage medium and corresponding to the step of controlling L audio output units among the N audio output units to output audio data of the first multimedia file according to the first display direction, include:

controlling the L audio output units among the N audio output units to output the audio coding data according to the first display direction, where a second electronic device at the first position may receive and obtain the audio coding data.

Optionally, after the execution of the computer instructions stored in the storage medium and corresponding to the step of controlling L audio output units among the N audio output units to output audio data of the first multimedia file according to the first display direction, other computer instructions are further stored in the storage medium, which include following steps when executed:

receiving a first input operation to change a display direction of the first display window from the first display direction to a second display direction;

acquiring the second display direction based on the first input operation; and controlling the L audio output units among the N audio output units to output the audio data of the first multimedia file according to the second display direction, where a transmission state of the audio data at a third position satisfies the first preset condition; and a third direction starting from a point of the first display window to the third position is consistent with the second display direction.

For the information proceeding method according to the third embodiment, when read or executed by an electronic device, computer instructions stored in the storage medium and corresponding to the boot method include:

obtaining M multimedia files, where M≥2, and the M multimedia files are played in M display windows respectively;

displaying the M display windows on the display unit when playing the M multimedia files;

acquiring a display direction of each of the M display windows, where a one to one relationship is provided between the M display directions and the M display windows; and controlling L audio output units among the N audio output units to output M pieces of audio data of the M multimedia files according to the M display directions, where a transmission state of audio data at one of the M positions corresponding to the M display windows satisfies a first preset condition, and N≥L≥1; where a one to one relationship is provided between the M positions and the M display windows, and a direction starting from a point of one of the M display windows to a position of the one of the M display windows is consistent with the display direction of the one of the M display windows.

One or more technical solutions according to embodiments of the application may have one or more of the following technical effects.

1. The method and electronic device according to embodiments of the application includes: when playing a first multimedia file, acquiring a first display direction of a first display window corresponding to the first multimedia file; controlling an output of audio data of the first multimedia file according to the first display direction. In this way, it is ensured that a transmission state of audio data at a first position satisfies a first preset condition, where the first position is in a line which starts from a point of the first display window and is in the first display direction. Thus, an electronic device can control an output state of the audio data of the multimedia file according to the display direction of a window for displaying the multimedia file.

2. In the method and electronic device according to embodiments of the application, the L audio output units, in which an angle between a central output direction of each of the L audio output units and the first display direction is smaller than a preset angle, is used to output the audio data of the multimedia file; and audio output units other than the L audio output units is controlled to be in a no output state. In this way, it is ensured that a volume of the audio data at a first position is large enough, and a volume of the audio data at a second position different from the first position is reduced, where the first position is in a line which starts from a point of the first display window and is in the first display direction.

3. In the method and electronic device provided in embodiments of the application, audio output units other than the L audio output units is controlled to output offset audio data corresponding to the audio data. In this way, the volume of the audio data at the first position is large enough, and the volume of the audio data at the second position different from the first position is further reduced, where the first position is in a line which starts from a point of the first display window and is in the first display direction.

4. In the method and electronic device according to embodiments of the application, the N audio output units is rotated under the control, such that an angle between a central output direction of each of the N audio output units and the first display direction is smaller than a second preset angle; and then the N audio output units is further controlled to output the audio data, so as to enhance the volume of the audio data at the first position, where the first position is in a line which starts from a point of the first display window and is in the first display direction.

5. In the method and electronic device according to embodiments of the application, when the audio data are audio coding data generated by coding the first multimedia file, the audio coding data are output under the control according to the first display direction, to enhance a signal intensity of the audio coding data at a first position, and improve a success rate of receiving the audio coding data by a second electronic device at the first position, where the first position is in a line which starts from a point of the first display window and is in the first display direction.

Although preferred embodiments of the application are described, those skilled in the art can change or modify the embodiments once they learnt the basic creative concept. Therefore, the appended claims are intended to be construed as including the preferred embodiments and all changes and modifications falling in the scope of the application.

Apparently, modifications and variations may be carried out on the application by those skilled in the art without departing from the spirit and the scope of the application. Therefore, if the modifications and the variations of the application are within the scopes of the claims of the application and the equivalent technologies thereof, the application is intended to include the modifications and the variations.

We claim:

1. A method for an electronic device comprising:
   obtaining a first multimedia file, where the first multimedia file is played in a first display window;
   displaying the first display window on a display unit;
   acquiring a first display direction of the first display window; and
   controlling L audio output units among N audio output units to output audio data of the first multimedia file according to the first display direction, wherein N≥L≥1; and wherein a first direction starting from a point of the first display window to a first position is consistent with the first display direction;
   wherein after controlling L audio output units among the N audio output units to output audio data of the first multimedia file according to the first display direction, the method further comprises:
   receiving a first input operation to change a display direction of the first display window from the first display direction to a second display direction;
   acquiring the second display direction based on the first input operation;
   controlling the L audio output units among the N audio output units to output the audio data of the first multimedia file according to the second display direction, wherein a transmission state of the audio data at a third position satisfies a condition in which a signal intensity of the audio data is greater than a first preset intensity; and a third direction starting from a point of the first display window to the third position is consistent with the second display direction.

2. The method according to claim 1, wherein in a case that a transmission state of the audio data at a first position satisfies a first preset condition and the first preset condition is that an amplitude of the audio data is larger than a first preset amplitude, the controlling L audio output units among the N audio output units to output audio data of the first multimedia file according to the first display direction, comprises:
   determining the L audio output units from the N audio output units according to the first display direction, wherein an angle between a central output direction of each of the L audio output units and the first display direction is smaller than a first preset angle;
   controlling the L audio output units to output the audio data; and
   controlling audio output units of the N audio output units except the L audio output units to output offset audio data corresponding to the audio data, wherein the offset audio data is configured to offset the audio data, and an amplitude of the audio data offset by the offset audio data at a second position is smaller than a second preset amplitude, and wherein the second position is different from the first position.

3. The method according to claim 1, wherein in a case that a transmission state of the audio data at a first position satisfies a first preset condition and the first preset condition is that an amplitude of the audio data is larger than a first preset amplitude, the controlling L audio output units among the N audio output units to output audio data of the first multimedia file according to the first display direction, comprises:
   determining the L audio output units from the N audio output units according to the first display direction, wherein an angle between a central output direction of each of the L audio output units and the first display direction is smaller than a first preset angle;
   controlling the L audio output units to output the audio data; and
   controlling audio output units of the N audio output units except the L audio output units to be in a no output state, wherein an amplitude of the audio data at a second position is smaller than a third preset amplitude, and the second position is different from the first position.

4. The method according to claim 1, wherein N=L, and each of the N audio output units is connected with the electronic device through a rotatable structure, the controlling L audio output units among the N audio output units to output audio data of the first multimedia file according to the first display direction, comprises:
   rotating the N audio output units under a control according to the first display direction, wherein an angle between a central output direction of each of the rotated N audio output units and the first display direction is smaller than a second preset angle; and controlling the N audio output units to output the audio data.

5. The method according to claim 1, wherein in a case that a first preset condition is that a signal intensity of the audio data is greater than a first preset intensity, the controlling L audio output units among the N audio output units to output audio data of the first multimedia file according to the first display direction, comprises:
controlling the L audio output units among the N audio output units to output the audio data according to the first display direction, wherein the audio data is sent to a second electronic device associated with the first position.

6. The method according to claim 1, wherein the first display window comprises M display windows, wherein M≥2, the L audio output units are corresponding to the M display windows, the method further comprising:
obtaining M multimedia files, and the M multimedia files are played in the M display windows respectively;
displaying the M display windows on a display unit;
acquiring direction display directions of the respective M display windows, wherein a one to one relationship is provided between the M display directions and the M display windows; and
controlling the L audio output units among the N audio output units to output M pieces of audio data of the M multimedia files according to the M display directions, wherein a transmission state of audio data at one of M positions corresponding to the M display windows satisfies a first preset condition; wherein a one to one relationship is provided between the M positions and the M display windows, and a direction starting from a point of the one of the M display windows to a position of the one of the M display windows among the M positions is consistent with the display direction of the one of the M display windows.

7. An electronic device, comprising:
a display unit;
N audio output units;
a first multimedia module which obtains a first multimedia file, wherein the first multimedia file is played in a first display window;
a first play module which displays the first display window on the display unit;
a first acquisition module which acquires a first display direction of the first display window;
a first control module which controls L audio output units among the N audio output units to output audio data of the first multimedia file according to the first display direction, wherein N≥L≥1; and wherein a first direction starting from a point of the first display window to a first position is consistent with the first display direction;
a receiving module which receives a first input operation to change a display direction of the first display window from the first display direction to a second display direction;
a second acquisition module which acquires the second display direction based on the first input operation; and
a second control module which controls the L audio output units among the N audio output units to output the audio data of the first multimedia file according to the second display direction, wherein a transmission state of the audio data at a third position satisfies a condition in which a signal intensity of the audio data is greater than a first preset intensity; and a third direction starting from a point of the first display window to the third position is consistent with the second display direction.

8. The electronic device according to claim 7, further comprising:
a first determining unit which determines the L audio output units from the N audio output units according to the first display direction, wherein an angle between a central output direction of each of the L audio output units and the first display direction is less than a first preset angle;
a first output unit which controls the L audio output units to output the audio data; and
an offset unit which controls audio output units of the N audio output units except the L audio output units to output offset audio data corresponding to the audio data, wherein the offset audio data is configured to offset the audio data, and an amplitude of the audio data offset by the offset audio data at a second position is smaller than a second preset amplitude, and the second position is different from the first position.

9. The electronic device according to claim 7, wherein in a case that a transmission state of the audio data at a first position satisfies a first preset condition and the first preset condition is that an amplitude of the audio data is larger than a first preset amplitude, the first control module comprises:
a second determining unit which determines the L audio output units from the N audio output units according to the first display direction, wherein an angle between a central output direction of each of the L audio output units and the first display direction is smaller than a first preset angle;
a second output unit which controls the L audio output units to output the audio data; and
a silencing unit which controls audio output units of the N audio output units except the L audio output units to be in a no output state, wherein an amplitude of the audio data at a second position is smaller than a third preset amplitude, and the second position is different from the first position.

10. The electronic device according to claim 7, wherein N=L, and each of the N audio output units is connected to the electronic device through a rotatable structure, the first control module comprises:
a rotation control unit which rotates the N audio output units under a control according to the first display direction, wherein an angle between a central output direction of each of the N audio output units and the first display direction is smaller than a second preset angle; and
a third output unit which controls the N audio output units to output the audio data.

11. The electronic device according to claim 7, wherein the electronic device comprises a first electronic device and wherein in a case that a first preset condition is that a signal intensity of the audio data is greater than a first preset intensity, the first control module further:
controls the L audio output units among the N audio output units to output the audio data according to the first display direction, wherein the audio data is sent to a second electronic device associated with the first position.

12. The electronic device according to claim 7, wherein the first display window comprises M display windows, wherein M≥2, the L audio output units are corresponding to the M display windows, the electronic device further comprising:

a multimedia module which obtains M multimedia files, and the M multimedia files are played in M display windows respectively;

a play module which displays the M display windows on the display unit when playing the M multimedia files;

an direction module which acquires direction display directions of the respective M display windows, wherein a one to one relationship is provided between the M display directions and the M display windows respectively; and the first control module which controls the L audio output units among the N audio output units to output M pieces of audio data of the M multimedia files according to the M display directions, wherein a transmission state of audio data at one of positions corresponding to the M display windows satisfies a first preset condition; wherein a one to one relationship is provided between the M positions and the M display windows, and a direction starting from a point of the one of the M display windows to a position corresponding to the one of the M display windows is consistent with the display direction of the one of the M display windows.

13. An apparatus comprising:
a processor;
a display;
a plurality of speakers; and
a memory which stores code executable by the processor to:

obtain audio data;

display a first display window on the display;

acquire a first display direction for the first display windows associated with the audio data;

control L audio output units among N audio output units to output audio data according to the first display direction, wherein N≥L≥1; and wherein a first direction starting from a point of the first display window to a first position is consistent with the first display direction;

receive a first input operation to change a display direction of the first display window from the first display direction to a second display direction;

acquire the second display direction based on the first input operation; and control the L audio output units among the N audio output units to output the audio data of a first multimedia file according to the second display direction, wherein a transmission state of the audio data at a third position satisfies a condition in which a signal intensity of the audio data is greater than a first preset intensity; and a third direction starting from a point of the first display window to the third position is consistent with the second display direction.

* * * * *

UNITED STATES PATENT AND TRADEMARK OFFICE
CERTIFICATE OF CORRECTION

PATENT NO. : 9,830,125 B2
APPLICATION NO. : 14/475848
DATED : November 28, 2017
INVENTOR(S) : Yuanyi Zhang et al.

Page 1 of 1

It is certified that error appears in the above-identified patent and that said Letters Patent is hereby corrected as shown below:

In the Claims

At Column 23, Claim number 12, Line number 15, insert --M-- between "of" and "positions"

Signed and Sealed this
Twenty-fourth Day of April, 2018

Andrei Iancu
*Director of the United States Patent and Trademark Office*